US005886687A

United States Patent [19]
Gibson

[11] Patent Number: 5,886,687
[45] Date of Patent: Mar. 23, 1999

[54] TOUCH PANEL SYSTEM UTILIZING CAPACITIVELY-COUPLED ELECTRODES

[76] Inventor: William A. Gibson, 2404 W. Gallaher Ferry Rd., Knoxville, Tenn. 37932

[21] Appl. No.: 802,924

[22] Filed: Feb. 20, 1997

[51] Int. Cl.[6] .................................................. G09G 5/00
[52] U.S. Cl. ...................... 345/173; 178/18.06; 345/174
[58] Field of Search .................................. 345/173, 174, 345/179; 178/18.01, 18.03, 18.05, 18.06

[56] References Cited

U.S. PATENT DOCUMENTS

| | | | |
|---|---|---|---|
| 3,530,241 | 9/1970 | Ellis | 178/19 |
| 3,591,718 | 7/1971 | Asano | 178/19 |
| 3,624,293 | 11/1971 | Baxter | 178/18 |
| 3,699,439 | 10/1972 | Turner | 324/71.1 |
| 4,071,691 | 1/1978 | Pepper, Jr. | 178/19 |
| 4,198,539 | 4/1980 | Pepper, Jr. | 178/18 |
| 4,220,815 | 9/1980 | Gibson et al. | 178/18 |
| 4,293,734 | 10/1981 | Pepper, Jr. | 178/18 |
| 4,353,552 | 10/1982 | Pepper, Jr. | 463/37 |
| 4,371,746 | 2/1983 | Pepper, Jr. | 364/565 |
| 4,680,429 | 7/1987 | Murdock et al. | 345/174 |
| 4,680,430 | 7/1987 | Yoshikawa et al. | 345/174 |
| 4,687,885 | 8/1987 | Talmage, Jr. et al. | 178/18 |
| 4,698,461 | 10/1987 | Meadows et al. | 345/174 |
| 4,922,061 | 5/1990 | Meadows et al. | 345/174 |
| 5,432,304 | 7/1995 | Tanahashi | 345/173 |
| 5,438,168 | 8/1995 | Wolfe et al. | 345/174 |
| 5,496,974 | 3/1996 | Akebi et al. | 345/174 |
| 5,550,329 | 8/1996 | Matsubayashi | 345/173 |
| 5,565,658 | 10/1996 | Gerpheide et al. | 178/18.06 |

OTHER PUBLICATIONS

William R. Smythe, *Static and Dynamic Electricity*, 2nd Ed., McGraw–Hill, 1950, p. 357.

*Primary Examiner*—Thomas Mullen
*Assistant Examiner*—John Tweel, Jr.
*Attorney, Agent, or Firm*—Michael E. McKee

[57] ABSTRACT

A touch screen system includes a touch screen having a surface which is adapted to be touched by a user, a resistive substrate which spans the screen and has two opposite boundaries, and a pair of electrodes which are capacitively coupled to the resistive substrate adjacent the two opposite boundaries thereof. The electrodes are adapted to be electrically stimulated from a source to induce reference electrical parameters within the system. Appropriate components are provided for determining changes in electrical parameters at the electrodes as a result of the touch of a location of the screen by the user, and associated componentry is also provided for generating a signal corresponding to the location of the screen touched by the user. The touch screen of the system may be associated with the screen of a CRT for use or placed upon a tabletop for use as a cursor control pad or a keyboard.

23 Claims, 5 Drawing Sheets

TOUCH PANEL SYSTEM UTILIZING CAPACITIVELY-COUPLED ELECTRODES

SUMMARY OF THE INVENTION

This invention relates generally to touch panel systems and relates, more particularly, to the means and methods for identifying a location touched on a touch panel.

Touch panels of the class with which this invention is concerned include touch screens which are adapted to overlie a computer monitor (e.g. a CRT or flat panel display) and enable a user to select a menu item by touching the screen in a predetermined location. Commonly, the touch of the screen is responsible for the generation of electrical characteristics which correspond to the coordinate location touched on the screen. Such touch screens are believed to provide some of the easiest and most user friendly means by which simple choices can be made on a computer monitor.

In addition, the touch of the screen with which this invention is concerned can be effected with a cursor control pad as well as with a finger or other suitable probe.

The touch panel systems which utilize capacitive sensors commonly involve a resistive layer on a glass substrate with electrodes affixed around the edges. During use of such a sensor, typically, the electrodes are simultaneously stimulated at the corners with a sine wave with a frequency of a few 10s of kilohertz. When the sensor is touched by the finger, the sensor is connected at that point to the body capacitance to ground and a small current flows from the electrodes. The location of the point touched is found by summing all of the currents flowing to the electrode corners and dividing the currents flowing to any two adjacent electrode corners by the total. The resulting ratio is the proportional distance along the axis perpendicular to a line joining the adjacent electrodes. Heretofore, however, the capacitive touch screen technology suffers from the standpoint of cost and the reliability of the electrode contacts with the resistive substrates.

Heretofore, no one has been able to produce electrode contact to the resistive substrate with long term reliability using mechanical or organic materials such as silver loaded epoxy. The failure of these contacts usually occurs slowly over a period of time and is particularly insidious. Consequently, reliable sensors generally are made with expensive silver frit contact electrodes. Furthermore, there are few manufacturers who are able to apply a suitable resistive coating and apply the electrode frits to the resistive coating on a glass substrate. Thus, the key element of the touch screen is from a very limited number of sources and little competition exists. Due to the required baking and organic nature of plastic substrates, sensors utilizing low cost plastic substrates with resistive coatings cannot be made using this technique.

It is an object of the present invention to provide a new and improved touch panel system which overcomes much of the limitations and drawbacks associated with touch panel systems of the prior art.

Another object of the present invention is to provide such a touch panel system having a screen which is capacitive in function yet circumvents the need for frit electrodes and the attending limitations associated therewith and permits the use of low-cost plastic substrates as a base screen material.

Still another object of the present invention is to provide such a touch panel system which is uncomplicated in structure, less expensive to manufacture, and yet effective in operation.

SUMMARY OF THE INVENTION

This invention resides in a touch panel system including a touch panel having a surface which is adapted to be touched by a user and including means providing a resistive substrate which spans the surface of the panel and has two opposite boundaries. A pair of electrodes are capacitively coupled to the resistive substrate adjacent the two opposite boundaries thereof, and means are provided for electrically stimulating the pair of electrodes from a source to induce reference electrical parameters within the system. The system also includes means associated with the electrodes for determining changes in electrical parameters of the system as a result of the touch of the surface of the panel by the user, and further includes means associated with the determining means for generating a signal corresponding to the location of the panel surface touched by the user.

By way of example, the determining means of the system can be adapted to measure the magnitude of the voltage change, the change in phase of the voltages, the magnitude of the changes in current flowing through the electrode circuits, or the change in phase of the currents flowing through the electrode circuits.

In an alternative embodiment of the invention, there are four electrodes situated along each edge of a four-edged panel. The associated means are connected to the electrodes for determining changes in electrical parameters along each of two coordinate axes as a result of the touch of the surface of the panel by the user so that the signal generated by the signal generating means corresponds to the two coordinate location at which the panel is touched by the user.

DETAILED DESCRIPTION OF THE ILLUSTRATED EMBODIMENTS

Figure 1:
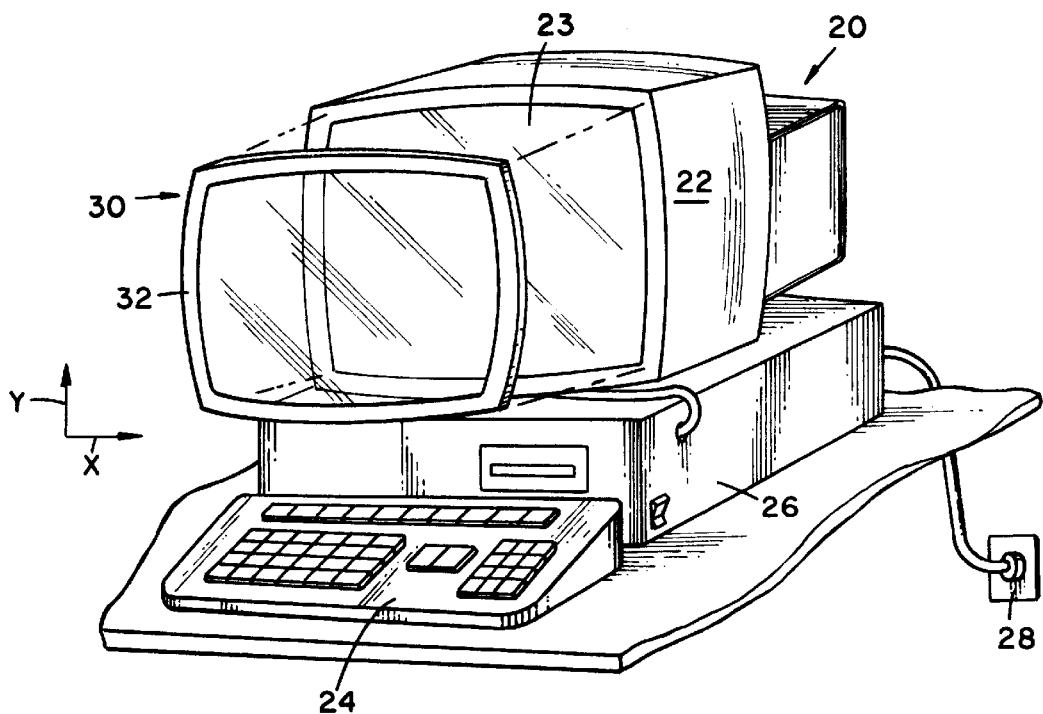
FIG. 1 is a perspective view of a computer assembly and embodiment of a touch screen system utilized with the computer assembly, shown exploded.

Turning now to the drawings in greater detail, there is illustrated in FIG. 1 an exemplary environment within which an embodiment, generally indicated 30, of a touch panel, or screen, system in accordance with the present invention is utilized. The depicted environment includes a computer assembly 20 including a cathode ray tube (CRT) 22 having a screen 23, a keyboard 24 and a computer section 26 which is connected to the screen 23 and keyboard 24 in a manner which is well known in the art. Electrical power is supplied to the computer assembly 20 through electrical wires from a source 28.

Although the depicted assembly 20 is shown with a keyboard 24, it will be understood that the system of the present invention can be utilized in keyboard-less system, such as in kisos and point of sale (POS) systems where the touch screen supplies the functions normally offered by a keyboard. Accordingly, the principles of the present invention can be variously applied.

The touch screen system 30 includes a touch screen 32 having a surface which is adapted to be touched by a user and which is positionable in a stationary condition across the screen 23 of the CRT 22. The touch screen system 30 also includes associated controller circuitry, described herein, which is used to supply stimulating electrical signals to touch screen 32 and to generate an X-Y coordinate signal which corresponds with the location (i.e. the point) within the touch screen 32 at which the screen 32 is touched by a user. Such coordinate signals may be used by the computer to initiate a desired, i.e. a predetermined, command within the computer assembly 20.

Figure 2:
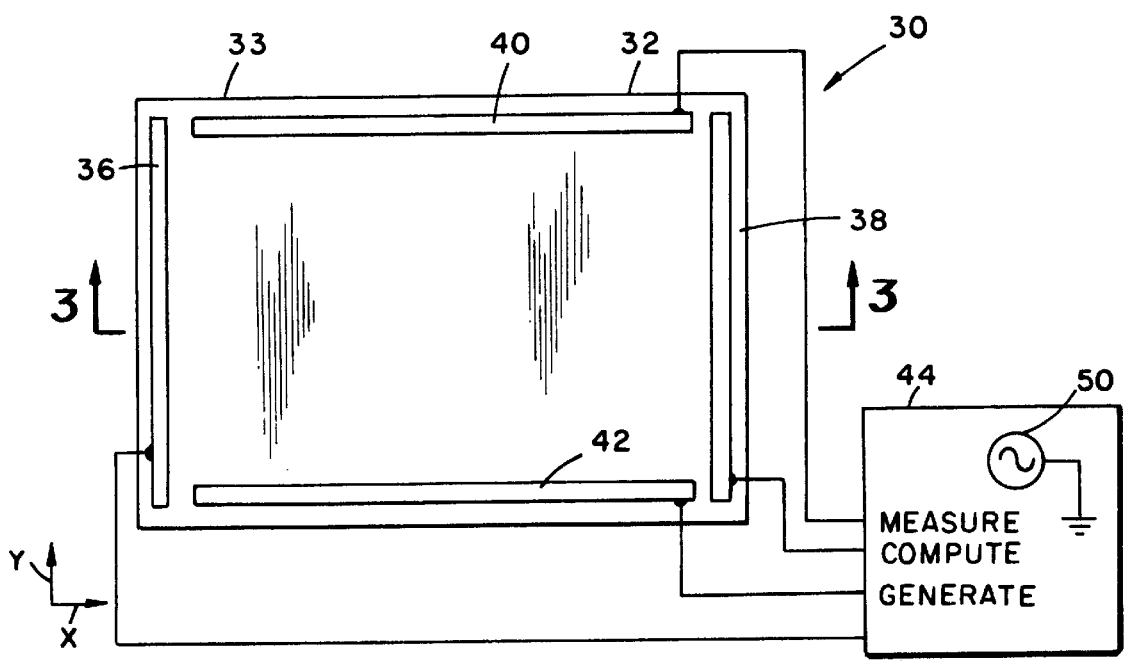
FIG. 2 is a front elevational view of the touch screen of the FIG. 1 embodiment.
Figure 3:
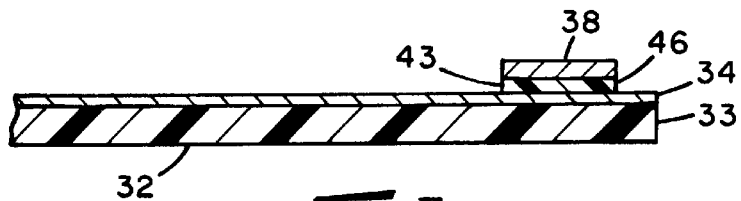
FIG. 3 is a fragmentary cross-sectional view taken about along line 3—3 of FIG. 2.

With reference to FIGS. 2 and 3, the screen 32 includes a broad base substrate 33 comprised, for example of substantially rectangular piece of plastic or glass, and a resistive layer, or substrate, 34 (FIG. 3) which overlies the base substrate 33. Furthermore, four elongated electrodes 36, 38, 40 and 42 are disposed along the four edges of the base substrate 33 and are capacitively coupled to the resistive substrate 34. More specifically, two electrodes 36 and 38 are disposed in substantially parallel relation to one another and arranged along two opposite edges of the screen 32, and the remaining two electrodes 40 and 42 are disposed in substantially parallel relation to one another and arranged along the remaining two opposite edges of the screen 32. Furthermore, each of the electrodes 40 and 42 is arranged generally parallel to the indicated X-coordinate direction while each of the electrodes 36 and 38 is arranged generally parallel to the indicated Y-coordinate direction. As will be apparent herein, the opposing pairs of electrodes are arranged generally perpendicular to the corresponding (X or Y) axis of interest.

Although the depicted electrodes 36, 38, 40 and 42 are shown in FIGS. 2 and 3 as substantially rectangular in shape, electrodes may be preferred which possess an alternate shape in order to correct for non-linearities introduced by the rectangular arrangement of electrodes.

Moreover, although the base substrate 33 of the depicted screen 32 is shown in FIG. 2 as generally rectangular in shape with substantially straight edges, the edges thereof could be bowed to correspond in shape to the arcuate edges of common CRTs. Furthermore, the base substrate 33 could be either flat or non-planar in configuration. In instances where it is desired that the base substrate 33 be transparent so that information (such as is borne on a CRT screen) is viewable through the base substrate 33, the material out of which the base substrate 33 is made (e.g. glass or plastic) is preferably transparent. In instances where the base substrate 33 need not be transparent such as in a keyboard-providing capacity, a cursor control pad or a graphics input pad, the material of the base substrate 33 can be opaque. Still further, the base substrate 33 (along with the resistive substrate 34 which overlies the base substrate 33) may be either relatively rigid or relatively flexible.

The resistive substrate 34 of the screen 32 is adapted to resist the passage of current therethrough and overlies one face (i.e. the front face) of the base substrate 33. While the resistive substrate 34 may be any of a number of alternative materials, the choice of material for the resistive substrate 34 may be chosen in light of the material comprising the base substrate 33. For example, a plastic base substrate 33 having a resistive substrate 34 coated thereon may be provided by a product which is currently available in sheets from Toyobo of Japan under the trade designation 300RE. The resistive substrate is very thin and is commonly deposited across one face of the plastic base substrate by an evaporation or sputtering technique. In the instance in which the base substrate 33 is comprised of glass, the resistive substrate 34 may be provided by a layer of indium-tin oxide (ITO) applied upon (as by a sputtering process) so as to coat one face of the glass base substrate.

The electrodes 36, 38, 40 and 42 are comprised of a conductive material which are maintained adjacent the surface of the resistive substrate 34 by means of an appropriate insulating medium in the form of a layer 43 (FIG. 3) which maintains a preselected spacing between each electrode and the adjacent face of the resistive substrate 34 and which prevents any electrical contact between the electrodes and the resistive substrate 34. This insulating layer 43 could be limited in surface area to about that of the electrodes which overlie the layer 43 (as is shown in FIG. 3) or, in the alternative, may be large enough to substantially cover the entire surface of the resistive substrate 34. In this latter case, the insulating layer 43 would not appreciably interfere with the operation of the touch screen system 30 since the finger of the user is capacitively coupled to the resistive substrate 34 at the point of touch.

The insulating layer 43 may be comprised of strips of insulative tape 46 (such as a double-side insulative tape whose dielectric constant is between about 2 and 3) positioned between the electrodes and the surface of the resistive substrate 34 or a thin layer (e.g. about 10 $\mu$M in thickness) of silicon dioxide ($SiO_2$) or some other insulating layer which has been deposited upon the resistive substrate 34 before the electrodes are attached thereto (or deposited thereon). Alternatively, the medium of the insulating layer 43 may be comprised of an organic material, such as silk screen ink.

The electrodes 36, 38, 40 and 42 may be comprised of a conductive tape (such as an aluminum tape) or be provided by a conductive paint or ink which has been coated, e.g. screened or painted, upon the insulating layer 43. Still further, the electrodes 36, 38, 40 or 42 may be appropriately coated over the insulating layer 43 in a plating, an evaporation or a sputter-deposition process.

Although the screen 32 has been shown and described above as including an insulating layer 43 which is separately identifiable from that of the base substrate 33, an alternative embodiment of a screen in accordance with the broader aspects of this invention may include electrodes which are positioned upon the rear face of the base substrate (so as to be disposed on the face of the base substrate opposite the resistive substrate). In such an embodiment, the base substrate may serve as the insulating layer between the electrodes and the resistive substrate. Still further, this entire embodiment could be constructed in a reverse order, or simply turned around, so that the resistive layer is disposed upon the rear face of the base substrate and the electrodes are disposed upon the front face of the base substrate.

The touch screen system 30 also includes means, indicated 50 in FIG. 2, for electrically stimulating the electrodes 36, 38, 40 and 42 during use of the system 30. In the depicted embodiment 30, the stimulating means 50 is provided by an oscillator so that the voltage sensed at the electrodes varies as a function of time. If desired, the stimulating means 50 may be designed to stimulate each set of opposite electrodes 36, 38 and 40, 42 either simultaneously or sequentially.

Before the touch screen 32 is touched by the finger of a user, the stimulating voltage supplied to the electrodes 36, 38, 40 and 42 establishes reference electrical parameters within the system and across the resistive substrate 34. When, however, the touch screen 32 is touched by the user, these electrical parameters are altered, and these altered parameters are used, along with the reference parameters, by appropriate computational circuitry, indicated 44 in FIG. 2, within the touch screen system 30 to generate a preselected, i.e. command, signal which corresponds to the location (i.e. the X and Y coordinate location) on the screen 32 which has been touched by the user. To this end, the touch screen system 30 includes appropriate means for measuring changes in various electrical parameters, described herein, associated with the system 30 as a result of the touch of a location of the screen 32 by the user and further includes means associated with the measuring means which utilizes the measured parameters to generate a signal or coordinate which corresponds to the location touched on the screen.

As used herein, the term "touched by a user" refers to the touch of the screen 32 by a portion of the user's body, such as a finger, or by a conductive instrument which is held by the user. Similarly, such a "touch" may be effected as a result of a mechanical or electrical contrivance which is controlled by the user or by a user-controlled curser control pad or screen keyboard.

Figure 4:
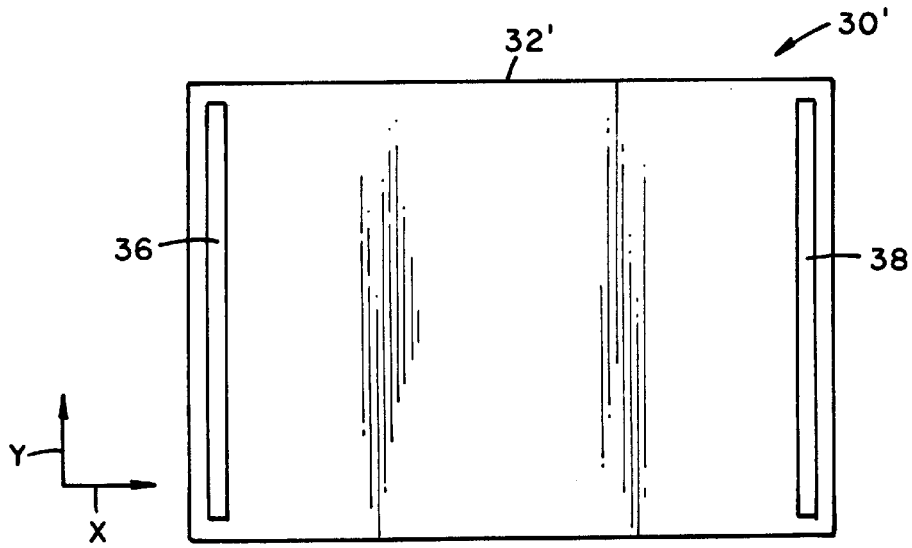
FIG. 4 is a view similar to that of FIG. 2 of a touch screen used in determining locations of a point touched on the screen relative to a single axis.
Figure 5:
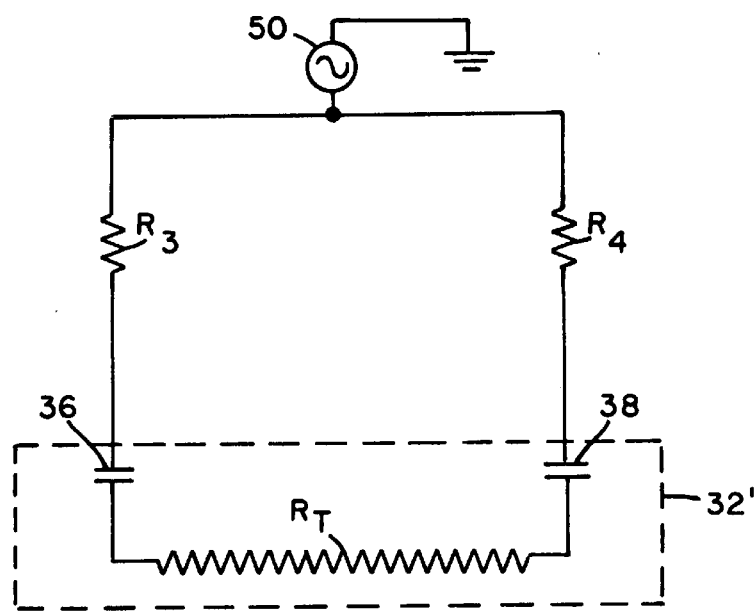
FIG. 5 is a view illustrating schematically the electrical equivalent circuit of a touch screen system which employs the screen of FIG. 4.

To aid one's understanding of the structure and operation of the touch screen system 30, there is depicted in FIG. 4 a touch panel 32' including a screen portion and resistive substrate like that of the screen 32 of FIG. 2, but including only two electrodes 36 and 38 which are attached at opposite ends of the screen 32'. When used to generate a signal corresponding to the location along a single axis (i.e. the X-axis) touched by a user, the touch screen 32' is thereby rendered a one-axis panel. Along these lines, there is shown in FIG. 5 a diagram illustrating schematically the electrical connection between various components of a touch system, indicated 30', which utilizes the one-axis touch panel 32'. In this system 30', resistors $R_3$ and $R_4$ have been connected in-line with the conductors which lead between the stimulating source 50 and a corresponding electrode 36 or 38.

Figure 6:
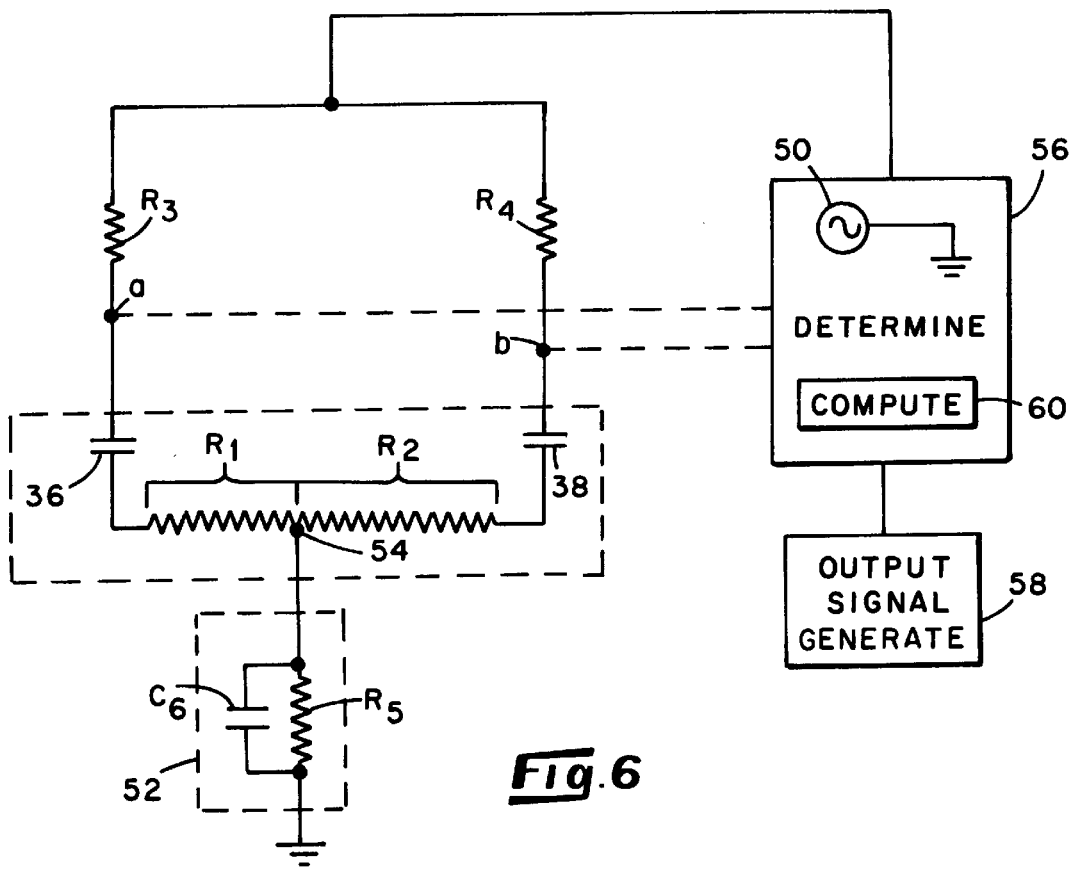
FIG. 6 is an electrical equivalent circuit view similar to that of FIG. 5 when the screen is touched by a user.

By comparison, there is shown in FIG. 6 an electrical equivalent diagram of the touch system 30' which has been touched at a random location by a user 52. The point of location of the touch, indicated 54 in FIG. 6, separates the total resistance, indicated $R_T$, of the resistive substrate of the panel 32' into portions $R_1$ and $R_2$ wherein $R_1$ is the resistance as measured generally between the left edge of the panel 32' (as shown in FIG. 4) and the point 54 while $R_2$ is the resistance as measured generally between the right edge of the panel 32' (as shown in FIG. 4) and the point 54.

With reference still to FIG. 6, it is a feature of the touch panel system 30' that it includes means, indicated 56, for determining changes in electrical parameters in various components of the system 30' as a result of the touch of a location of the screen 32' by the user, and associated means 58 for generating a signal corresponding to the location of the screen touched by the user. Associated with the determining means 56 is computational means 60 which, among other calculations, may calculate the ratio $R_1/R_T$ (or $R_2/R_T$) from the measured changes in electrical parameters following the touch of the screen location 54 to provide an identification of the position of the location 54 relative to the left or right edge of the screen 32' or, more specifically, the coordinate position of the location 54 of touch along the X-axis. Upon determining the aforementioned ratio $R_1/R_T$ (or $R_2/R_T$), the signal-generating means 58 generates a desired command signal which corresponds to the determined coordinate.

With reference still to the electrical equivalent diagram of FIG. 6 wherein the screen location 54 has been touched by the user 52, calculations show that the voltage drop, $V_a$, across $R_3$ as measured from the reference (i.e. stimulation) voltage $V_o$ is provided in Equation 1 below. (For the sake of simplifying calculations, $C_1$ and $C_2$ are made equal to one another and designated C in Equation 1.)

$$V_a = \frac{R_3}{R_1 + R_3 + \frac{1}{j\omega C}} (V_o - V_c) \qquad \text{Eq. (1)}$$

wherein $V_c$ is the voltage measured at the touch location 54, "j" is the $(-1)^{1/2}$ indicative of a complex voltage, "ω" is the frequency (in radians per second), and "C" is the total capacitance.

Similarly, the voltage drop, $V_b$, across $R_4$ as measured from $V_o$ is provided in Equation 2 below.

$$V_b = \frac{R_4}{R_2 + R_4 + \frac{1}{j\omega C}} (V_o - V_c) \qquad \text{Eq. (2)}$$

Each of the voltages $V_a$ and $V_b$ are complex and depend upon the value $(V_o - V_c)$ which is also a complex quantity dependent upon the capacitance of the user's body (by way of his finger) or a comparable user-controlled probe which touches. (In practice, the effects of parasitic capacitance between the sensor and the surroundings may effect the set-up which corresponds to the foregoing equations, but the parasitic capacitance will be ignored for present purposes.)

The magnitude of the ratio of the voltages $V_a$ and $V_b$, which does not depend upon the probe capacitance since the value $(V_o - V_c)$ cancels out, is provided in Equation 3 below. (Again, for the sake of simplifying calculations, $R_3$ and $R_4$ are made equal to one another and designated R in Equation 3.)

$$\left| \frac{V_a}{V_b} \right| = \sqrt{\frac{(R+R_2)^2 + \frac{1}{\omega^2 C^2}}{(R+R_1)^2 + \frac{1}{\omega^2 C^2}}} \qquad \text{Eq. (3)}$$

Figure 7:
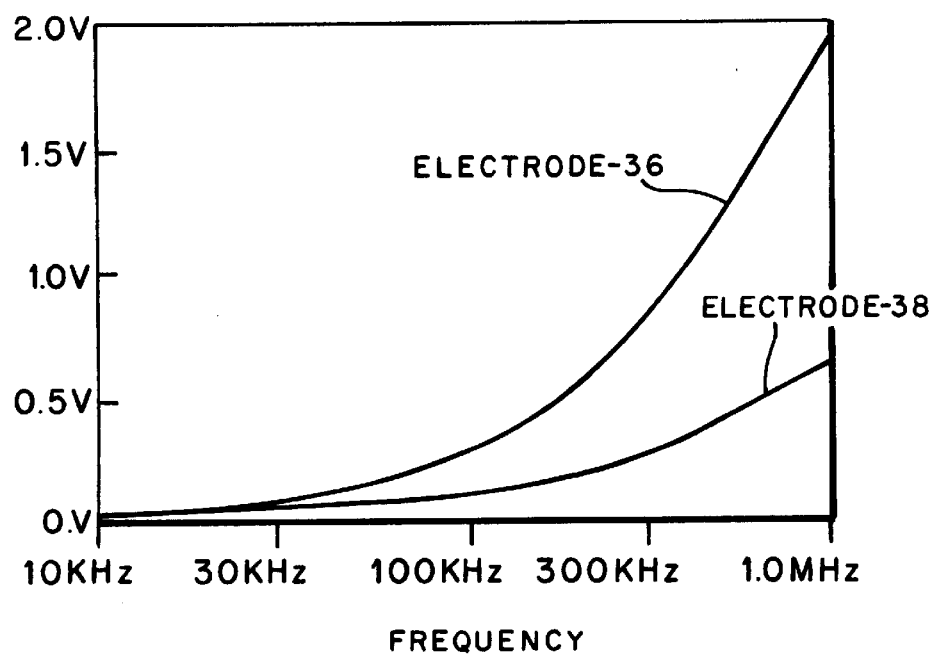
FIG. 7 is a graph which bears plots of the voltage across resistors $R_3$ and $R_4$ of the FIG. 6 circuit as the stimulation voltage frequency is swept.

With reference to FIG. 7, there is shown a computer-generated plot by sweeping the frequency of the stimulation voltage (a sine wave in this case) and measuring the voltage at points "a" and "b" (i.e. across $R_3$ and $R_4$, respectively) which shows that the voltage across R varies with frequency. Of course, R is maintained constant for purposes of gathering the sweep data of FIG. 7, but it can be seen in FIG. 7 that with the appropriate selection of parameters made for this sweep that the frequency must be several hundred kHz in order to obtain sufficient voltage differences which will provide accurate coordinate calculations. It is further noted by inspection of Eq. 3 that if $R_1$ and $R_2$ are selected to be relatively large with respect to R, and if C is also selected to be sufficiently large so that 1/C is sufficiently small, then $1/\omega^2 C^2$ is sufficiently small above a given frequency, then Equation 3 reduces to:

$$\left|\frac{V_a}{V_b}\right| \approx \frac{R_2}{R_1} \qquad \text{Eq. (4)}$$

and the calculation for the coordinate is simplified. Therefore, with the appropriate selection of the aforedescribed parameters, the ratio $R_1/R_T$ (or $R_2/R_T$) wherein $R_T=R_1+R_2$, can be accurately calculated as a function of the ratio of the voltages $V_a$ and $V_b$.

By way of example, each of $R_3$ and $R_4$ can be selected to be 200 ohms, $C_1$ and $C_2$ can be selected to be 3 nanofarads, $R_T$ can be selected to be 2000 ohms, and the user's finger (or touch probe) characteristics $C_6$ and $R_5$ can be selected to be 300 picofarads and 100 megohms, respectively. Moreover, $R_1$ is selected to be 500 ohms, while $R_2$ is selected to be 2000 ohms. In this example, $R_T$ is not small in comparison to $R_1$ and $R_2$ so that these exemplary values will not permit the approximation set forth in Equation (4). It will be understood, therefore, that the principles of the present invention are not limited to the situation wherein $R_T$ is small in comparison to $R_1$ and $R_2$. However, it does follow from the foregoing that judicious choices of the parameters, when possible, will reduce the complexity of calculating the coordinates.

Still another method of calculating the ratio $R_1/R_T$ (or $R_2/R_T$) involves the phase angles of the voltage (or the current) at points "a" and "b".

More specifically, the phase angles $\Theta_a$ and $\Theta_b$ of the voltage can be measured at points "a" and "b" and are given by the expressions:

$$\Theta_a = \arctan(1/(R+R_1)\omega C) \qquad \text{Eq.(5a)}$$

and $$\Theta_b = \arctan(1/(R+R_2)\omega C) \qquad \text{Eq.(5a)}$$

Figure 8:
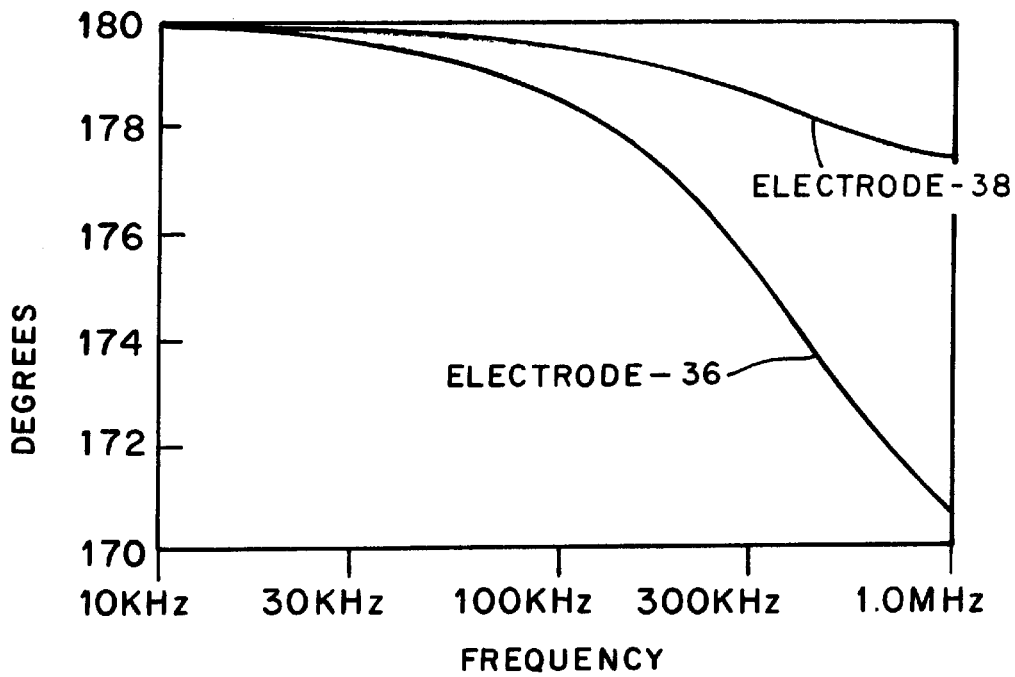
FIG. 8 is a graph bearing a plot of the voltage phase shift at points "a" and "b" of the FIG. 6 circuit as the stimulating voltage frequency is swept.

The difference between the angles $\Theta_a$ and $\Theta_b$ is independent of the phase of $(V_o-V_c)$ thus, the probe capacitance. The difference between the voltage phases at points "a" and "b", wherein the quantities of the FIG. 6 parameters are those provided above (i.e. each of $R_3$ and $R_4$ is selected to be 200 ohms, $C_1$ and $C_2$ is selected to be 3n, $R_T$ can be selected to be 2000 ohms, and the user's finger (or touch probe) characteristics $C_6$ and $R_5$ is selected to be 300 p and 100 megohms, respectively,) are shown in FIG. 8.

The magnitude of the current ratios is provided by the following expression:

$$\left|\frac{I_a}{I_b}\right| = \sqrt{\frac{R_2^2 + \dfrac{1}{\omega^2 C^2}}{R_1^2 + \dfrac{1}{\omega^2 C^2}}} \qquad \text{Eq. (6)}$$

Figure 9:
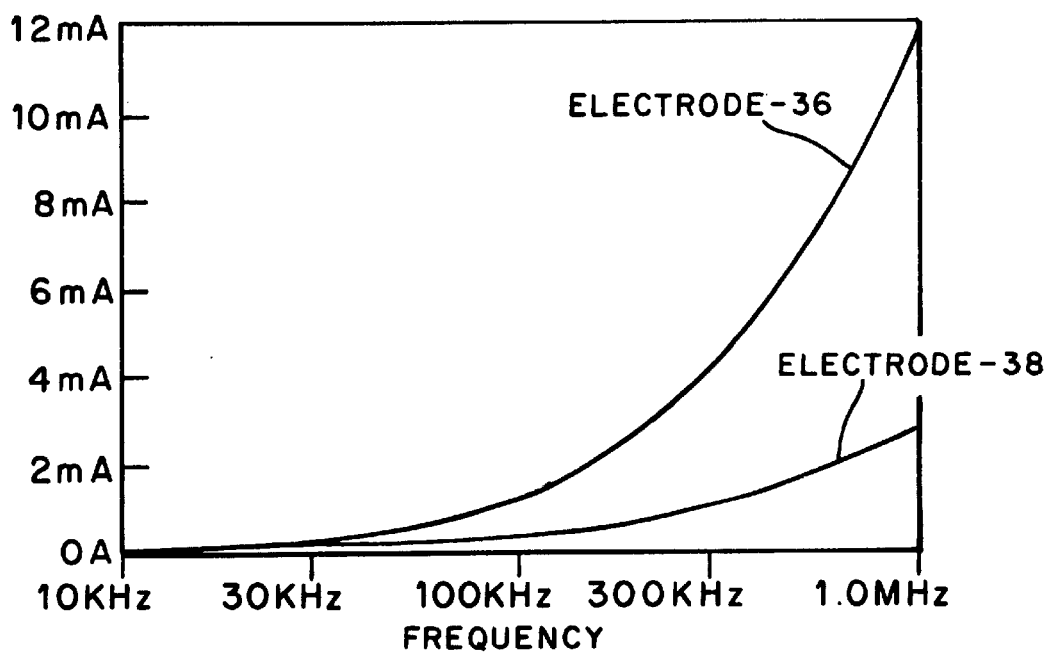
FIG. 9 is a graph bearing plots of the currents associated with the FIG. 6 circuit as the stimulating voltage frequency is swept and wherein $R_3$ and $R_4$ are set to zero.

Note that in the case of current measurements, $C_1$ and $C_2$ are set equal to one another and designated C in Equation (6) and that R is set to zero which further simplifies the calculations of the coordinates. FIG. 9 shows the change in currents in the opposing electrodes as the stimulated voltage frequency is swept. Again, if $R_1$ and $R_2$ are large in comparison to $1/\omega C$, then the above equation reduces to:

$$\left|\frac{I_a}{I_b}\right| \approx \frac{R_2}{R_1} \qquad \text{Eq. (7)}$$

Finally, the phase angles of the current through points "a" and "b" relative to complex voltage $(V_o-V_c)$ are the angles whose tangents are the ratios of the magnitude of the imaginary part of the multiplier of $(V_o-V_b)$ divided by the real part, thus:

$$\phi_a = \arctan(1/R_1\omega C) \qquad \text{Eq. (8a)}$$

and $$\phi_b = \arctan(1/R_2\omega C) \qquad \text{Eq. (8b)}$$

Figure 10:
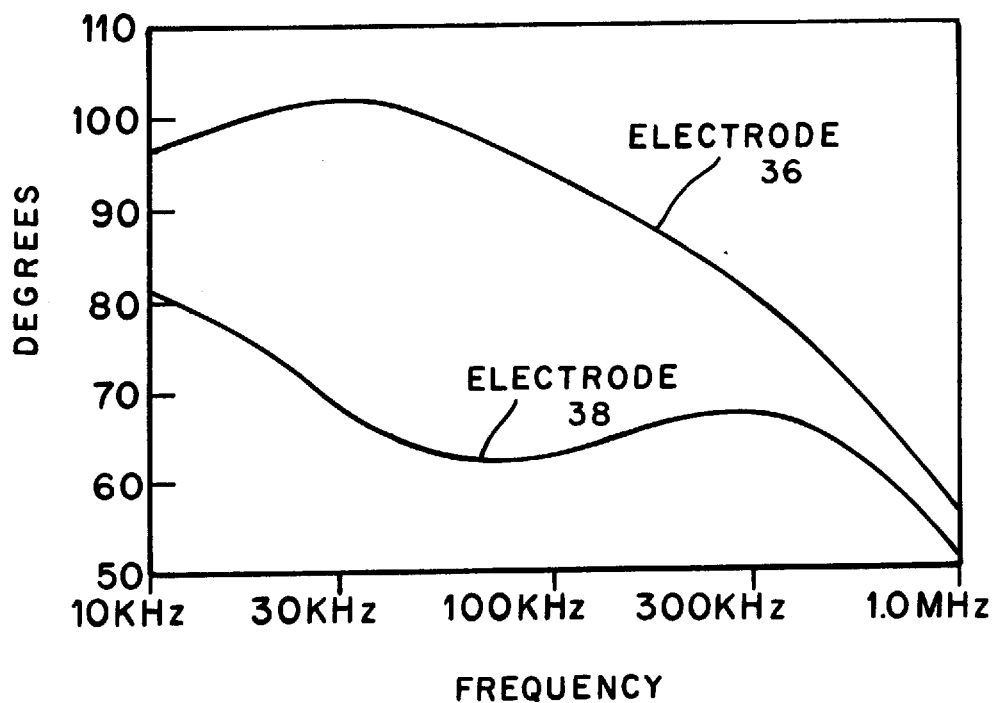
FIG. 10 is a graph bearing plots of the current phase change in the opposing electrode circuits as the stimulating voltage frequency is swept.

At a given frequency, the phase of the current is constant throughout each separate electrode circuit. It is noted that the phase of the current can be measured with R set to zero to simplify the sensor and calculations of the coordinates. The current phase change in the opposing electrode circuits as the frequency of the voltage is swept is shown in FIG. 10. The expression $\Phi_a-\Phi_b$ is independent of the phase of $(V_o-V_c)$ and therefore the value of the capacitance of the touching finger (or probe). For maximum calculation sensitivity, the parameters should be chosen so that $\Phi_a$ and $\Phi_b$ are approximately 45° when the screen 32' is touched in the middle. Offsets to the resulting coordinates can be added later for convenience.

The above electrical quantities can be measured when the finger (or probe) touches the screen 32' and from the above equations, the ratio $R_1/R_T$ (or $R_2/R_T$) can be determined and, more specifically, the location 54 of the touch can be determined. Thus, the ratio of $R_1/(R_1+R_2)$ is the fraction of the distance from one edge of the sensor to the other (assuming a uniform resistive coating on the base substrate and appropriate electrode shape).

Unlike the aforediscussed equivalent circuit, the resistances $R_1$ and $R_2$ are not a result of a discrete resistance, but instead represent a weighted integration of the resistance surrounding the point touched. As noted above, the coordinates are not a linear function of the measured electrical quantities and either analog, digital, or a combination of these techniques must be used to output rectangular coordinates.

The examination and discussion of the above equations show that the choice of the parameters of resistance, stimulation frequency, and capacitance are significant. Currently, the resistance of a transparent coating can be made from 10–3,000 ohms/sq. Opaque coatings can be made in a much broader range of resistances. The capacitance of the electrode of the screen 32' can be varied by varying the area of the electrode (e.g. its width), the separation from the resistive layer and the dielectric constant of the insulation between the electrode and the resistive layer. The stimulation frequency can be varied easily but the practical range is probably between 10 kHz and 1 MHz.

Noting that in accordance with one technique of this invention, the objective is to find the coordinate location by determining the ratio $R_1/R_T$ or $R_2/R_T$, it is seen in Equation 3 that R should be chosen so that it is small compared to $R_1$ or $R_2$; otherwise, the value of R will render the calculation of $R_1$ and $R_2$ much more difficult and less likely to be accurate. Likewise, $R+R_1$ and $R+R_2$ should be large compared to $1/\omega C$. In a similar manner, in Equation 6, $R_1$ or $R_2$ should be large with respect to $1/\omega C$.

In the case of Equations 5 and 8, the situation is quite different. In order to eliminate the effect of the phase changes caused by variations in the body capacitance (e.g.

from one user to another), the two phase angles must be subtracted from each other. More particularly, the quantity $\Phi_a-\Phi_b$ must be found, and to provide accurate coordinates, the difference between these phase angles should be large. The tangent of an angle goes from zero to ∞ as the angle goes from zero to 90°, thus the maximum difference would occur when the product of $1/r\omega C$ (where $r=R+R_1$ or $R_2$) is large for one phase angle and small for the other. Therefore, when the point of touch is moved further from the center of the panel, it is desirable that one phase angle becomes small in comparison to the other. In the case of the current measurement, R can be made zero and this goal is easier to achieve. A rule of thumb is that when the screen 32' is touched in the center, $r\omega C$ should be equal to about 1.0 with each phase angle equal to about 45°.

As mentioned earlier, the foregoing discussion was based upon a screen 32' having a pair of electrodes 36 and 38 disposed along opposing side edges of the screen 32'. However and as in the case of screen 32 of the system 30 of FIGS. 1–3, independent electrodes can be placed along each of the four sides of the screen 32 and independently connected to the stimulation source 50. The opposing pairs of the electrodes can be stimulated sequentially in pairs or simultaneously. Four electrode-screens, with all electrodes stimulated simultaneously, would likely be the most suitable configuration for a two dimensional touch screen and, accordingly, would most likely be the preferred embodiment.

On screens, such as screen 32' of FIG. 4, having only two opposing rectangular electrodes, the current which flows to the user's finger (or contact probe) is in proportion to the perpendicular distance from the electrodes stimulated, and the current flow is independent of the finger (or probe) position along a line parallel to the electrodes. However, with the addition of rectangular electrodes on each of the four edges, the current flow to the finger (or probe) is no longer independent of the position along a line parallel to opposing electrodes (except in the center). This is because the current flow to the finger (or probe) is from all four electrodes and the contribution from each electrode depends upon the distance of the finger (or probe) from the electrode. This is true whether the opposing pairs of electrodes are stimulated separately or simultaneously. The result is that line of constant ordinate or abscissa as measured by the sensor system is not straight.

To illustrate this effect, assume a screen with four rectangular stimulated electrodes. As the finger (or probe) is moved close to one of the four corners, the current flow to the finger (or probe) will come almost entirely from the two electrodes forming the corner and be divided equally between the two electrodes. If the finger (or probe) is then moved along and close to an electrode which is parallel to the X-axis, more current will flow from that electrode as the finger (or probe) retreats from the electrode which is parallel to the Y-axis. The greater current flow in the electrode which is parallel to the X-axis will increase the magnitude of the measured value of the coordinate represented by the ordinate and will become a maximum in the center of the electrode. Thus, the coordinate system generated by the screen will not be rectilinear. (Note that this problem is independent of the fact that the proposed readout techniques also result in a nonlinear coordinate system.)

Figure 11:
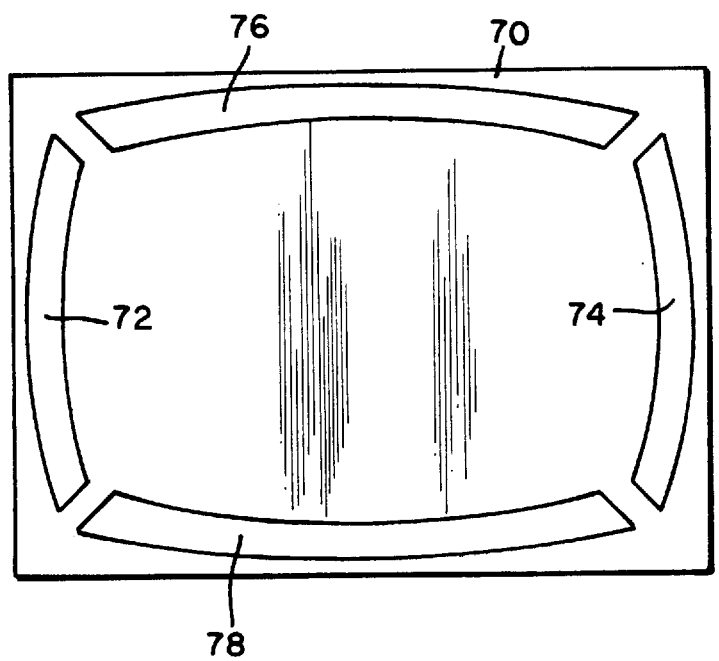
FIG. 11 is a view similar to that of FIGS. 2 and 4 of still another embodiment of a touch panel.

This problem can be addressed in two ways. The first way is to modify the shape of the electrode (or bow the electrode) so that the distance between the opposing electrodes increases as a path is traced toward the center of the screen (as is shown in screen 70 of FIG. 11 having bowed electrodes 72, 74, 76, 78), and the second way is to decrease the capacitive coupling between the electrode and the resistive substrate as a path is traced from the edge of the screen toward the center thereof. The capacitive coupling between the electrode and the resistive substrate can be varied by changing the width of the electrode along its length. (By narrowing the electrode as the center is approached, the capacitance is decreased, thereby compensating for the decrease in current at the ends of the electrode.) The capacitance can also be varied along the length of the electrode by changing the separation between the electrode and resistive substrate or by varying the dialectic constant of the insulator between the electrode and resistive substrate as a path is traced from the edges of the screen toward the center thereof.

Decreasing the width of the electrode toward the center of the screen (as is the case with the screen 70 of FIG. 11) so that the inner edges are bowed in an outward direction is believed to be the preferred choice because it also increases the distance between the electrodes as the center is approached; and both of these factors add together to compensate for the reduction of current as the ends of the electrode are approached. Still another advantage may be that the active area of some CRTs bow outwardly toward the center of the edges and the bowing of the electrode allows a sensor which displays the entire viewing area of the CRT to be smaller. This latter advantage often allows the monitor bezel to be used without modification, resulting in lower mounting cost.

To one skilled in the art, it will be appreciated that the accuracy of the aforedescribed system may be limited by the effects of parasitic capacitance to ground of the touch screen to the surroundings. Such parasitic capacitance provides a path for current flow to ground in parallel with the current flow to the finger (or probe) which touches the point on the screen of interest and may cause displacement of the true coordinate value when the sensor is touched. Furthermore, the parasitic capacitance may also cause the coordinate generated to be dependent upon the body capacitance to ground (e.g. the grabbing of a gas pipe is likely to change the coordinate). Although known methods exist for reducing the effects of parasitic capacitance, none are believed to totally eliminate these effects.

Although analog or digital, or a combination of the two, may be used to reduce these effects, it is beyond the scope of the present invention to provide novel means for resolving the problems presented by parasitic capacitance as it relates to the aforedescribed system. Parasitic capacitance is identified herein, however, as a phenomena which, under certain circumstances, will affect the accuracy of the output (i.e. the identification of the coordinate locations of the touch point) by the system of the present invention.

It will be understood that numerous modifications and substitutions can be had to the aforedescribed embodiment without departing from the spirit of the invention. For example, as an alternative to mounting the touch panel of the aforedescribed system in a vertical plane against the screen of a CRT, the touch panel may be laid flat (e.g. in a substantially horizontal orientation) upon a table for use as a replacement for a mouse, or more specifically, for use as a cursor control pad or a keyboard. Accordingly, the aforedescribed embodiment is intended for the purpose of illustration and not as limitation.

I claim:

1. A touch panel system comprising:
    a touch panel having a surface which is adapted to be touched by a user and including means providing a resistive substrate which spans the surface of the panel and has two opposite boundaries, and a pair of electrodes which are capacitively coupled to the resistive substrate adjacent the two opposite boundaries thereof so that the capacitance between the electrodes and the resistive substrate remains fixed during system operation;

means for electrically stimulating the pair of electrodes from a source to induce reference electrical parameters within the system through the resistive substrate and the capacitive coupling between the electrodes and the resistive substrate;

means for determining changes in the electrical parameters effected by the touch of a location of the panel surface by the user wherein the changes in the electrical parameters involve the resistances sensed along the resistive substrate between the point of touch and the boundaries of the resistive substrate by way of the fixed capacitive coupling between the electrodes and the resistive substrate; and means associated with the determining means for generating a signal corresponding to the changes in the electrical parameters effected by the user's touch of the panel surface so that the generated signal corresponds to the location on the panel surface touched by the user.

2. The system as defined in claim 1 wherein the determining means includes one resistor connected in-line between the source of electrical stimulation and one of the electrodes of the pair and another resistor connected in-line between the source of electrical stimulation and the other of the electrodes of the pair, and wherein the magnitude of the resistors and the resistance provided by the resistive substrate as measured between the opposite boundaries of the panel are preselected so that the location on the surface of the panel touched by a user is a function of the magnitude of the voltages measured across the resistors.

3. The system as defined in claim 1 wherein the determining means includes one resistor connected in-line between the source of electrical stimulation and one of the electrodes of the pair and another resistor connected in-line between the source of electrical stimulation and the other of the electrodes of the pair, and the determining means further includes means for measuring the phase of the voltage across the one and the another resistors during the touch of a location on the surface of the panel by the user and is adapted to generate said signal as a function of the measured phase difference between the voltages.

4. The system as defined in claim 1 wherein the determining means includes means for measuring the magnitude of the current through each of the two of the pair of electrodes as a consequence of the touch of a location on the panel by the user and is adapted to generate said signal as a function of the magnitude of measured currents.

5. The system as defined in claim 1 wherein the determining means includes means for measuring the phase of the current flowing through each of the two electrodes during the touch of a location on the panel by the user and is adapted to generate said signal as a function of the phase difference between the currents.

6. The system as defined in claim 1 wherein the resistive substrate of the touch panel is comprised of a layer of Indium-Tin Oxide (ITO).

7. The system as defined in claim 1 wherein each electrode is separated from the resistive substrate by an insulating medium, and the insulating medium is provided by a layer of organic material.

8. The system as defined in claim 1 wherein the touch panel includes a base substrate, and the resistive substrate is coated upon the base substrate.

9. The system as defined in claim 8 wherein the base substrate is relatively transparent.

10. The system as defined in claim 8 wherein the base substrate has a front face and an opposite rear face, the resistive substrate is coated upon the front face of the base substrate, and the electrodes are affixed upon the rear face of the base substrate.

11. The system as defined in claim 10 wherein the base substrate has a front face and an opposite rear face, the resistive substrate is coated upon the rear face of the base substrate, and the electrodes are affixed upon the front face of the base substrate.

12. A touch panel system comprising:

a touch panel having a surface which is adapted to be touched by a user and including means providing a resistive substrate which spans the surface of the touch panel and has two opposite edges, and a pair of electrodes capacitively coupled to the resistive substrate adjacent the opposite edges thereof so that the capacitance between the electrodes and the resistive substrate remains fixed during system operation;

means for electrically stimulating the pair of electrodes from a source so that electrical parameters are induced within the system through the resistive substrate and the capacitive coupling between the electrodes and the resistive substrate;

means for determining a single-coordinate location of the panel surface touched by the user by way of the capacitive coupling between the electrodes and the resistive substrate wherein said single-coordinate location is a function of the distance from the panel surface location touched by the user to one of the electrodes of the pair of electrodes, said location-determining means including means for sensing electrical parameters at the electrodes before the surface is touched by the user and after the surface is touched by the user and means for determining differences in the electrical parameters effected by the touch of the panel surface so that the determination of the single-coordinate location of the panel surface touched by the user is a function of said determined differences and wherein the differences in the electrical parameters involve the resistance values sensed along the resistive substrate between the point of touch and the boundaries of the resistive substrate; and means for generating a signal corresponding to the determined single-coordinate location of the panel touched by the user.

13. The system as defined in claim 12 wherein the opposite edges of the resistive substrate is a first pair of opposite edges, the pair of electrodes is a first pair of electrodes, and the resistive substrate includes a second pair of opposite edges which extend generally between the first pair of opposite edges;

the touch panel further includes a second pair of electrodes which are capacitively coupled to the resistive substrate adjacent the second pair of opposite edges thereof;

the means for electrically stimulating is adapted to electrically stimulate the second pair of electrodes and the system further includes means for determining another single-coordinate location of the panel surface touched by the user wherein the another single-coordinate location is a function of the distance from the panel surface location touched by the user to one of the electrodes of the second pair of electrodes, said location-determining means is adapted to sense the electrical parameters at the electrodes of the second pair of electrodes before the surface is touched by the user and after the surface is touched by the user, and the means for determining differences is adapted to determine differences in the electrical parameters at the second pair of electrodes effected by the touch of the panel surface so that the determination of said another single-coordinate location of the panel surface touched by the user is a function of said determined differences in the electrical parameters at the second pair of electrodes; and means for generating a signal corresponding to the determined another single-coordinate location of the panel touched by the user so that the signals generated by the generating means correspond to a two coordinate location of the panel surface touched by the user.

14. The system as defined in claim 12 wherein the means for electrically stimulating the electrodes from a source is adapted to stimulate the electrodes simultaneously.

15. The system as defined in claim 13 wherein the means for electrically stimulating the electrodes from a source is adapted to stimulate the two electrode pairs sequentially.

16. The system as defined in claim 12 wherein the location-determining means includes one resistor connected in-line between the source of electrical stimulation and one of the electrodes of the pair and another resistor connected in-line between the source of electrical stimulation and the other electrode of the pair, and wherein the magnitude of the resistors and the resistance provided by the resistive substrate as measured between the opposite boundaries of the panel are preselected so that the location on the surface of the panel touched by a user is a function of the magnitude of the voltages measured across the resistors.

17. The system as defined in claim 12 wherein the location-determining means includes one resistor connected in-line between the source of electrical stimulation and one of the electrodes of the pair and another resistor connected in-line between the source of electrical stimulation and the other electrode of the pair, and the determining means further includes means for measuring the phase of the voltage across the one and the another resistors during the touch of a location on the surface of the panel by the user and is adapted to generate said signal as a function of the measured phase difference between the voltages.

18. The system as defined in claim 12 wherein the location-determining means includes means for measuring the magnitude of the current through each of the two of the pair of electrodes as a consequence of the touch of a location on the panel by the user and is adapted to generate said signal as a function of the magnitude of measured currents.

19. The system as defined in claim 12 wherein the determining means includes means for measuring the phase of the current flowing through each of the two electrodes during the touch of a location on the panel by the user and is adapted to generate said signal as a function of the phase difference between the currents.

20. The system as defined in claim 12 wherein the geometry and size of the touch panel are configured to overlie and conform to the geometry and size of a screen of a CRT with which the system is intended to be used.

21. The system as defined in claim 12 wherein the system is utilized as a cursor control pad or a keyboard.

22. The system as defined in claim 13 wherein the electrodes are shaped so that the signals generated by the signal-generating means evidence a substantially rectilinear two-coordinate system.

23. The system as defined in claim 13 wherein the capacitive coupling between each electrode and the resistive substrate is decreased as a path is traced from the corresponding edge of the panel toward the center thereof so that the two-coordinate signals generated by the signal-generating means evidence a substantially rectilinear two-coordinate system.

* * * * *